United States Patent
Colitz, Jr.

Patent Number: 5,430,503
Date of Patent: Jul. 4, 1995

[54] PEN AND GLASSES COMBINATION

[76] Inventor: Michael J. Colitz, Jr., 85 Bristol St., Brooklyn, N.Y. 11212

[21] Appl. No.: 260,247

[22] Filed: Jun. 14, 1994

[51] Int. Cl.⁶ ............................................. G02C 11/00
[52] U.S. Cl. ................................... 351/116; 351/111; 351/158
[58] Field of Search ............... 351/41, 111, 116, 158; 24/3 C, 10 R

[56] References Cited

U.S. PATENT DOCUMENTS

| | | | |
|---|---|---|---|
| 3,266,111 | 8/1966 | Abel | 351/158 |
| 3,647,059 | 3/1972 | Humphreys | 351/158 X |
| 4,852,221 | 8/1989 | Antonucci | 24/3 C |
| 5,223,861 | 6/1993 | Wagner | 351/111 |

Primary Examiner—William L. Sikes
Assistant Examiner—David R. Parsons

[57] ABSTRACT

A new and improved pen and glasses combination with a first eyeglass component having one receiving arm with an oblong recess therein. A tapered extension is integral with the recess. A female detent element is secured to the recess. A curved ear component has an externally threaded extension and is secured thereon. The curved ear component functions to fit over a wearer's ear. An attachment component has an internally threaded aperture therein. The internally threaded aperture corresponds with the externally threaded extension of the curved ear component. An implement extension is integral with the attachment component. A male detent element is secured to the implement extension. The male detent element corresponds with the female detent element of the oblong recess of the first eyeglass component to lock the attachment component with the first eyeglass component. An oblong recess is formed in the implement extension. A pen component is secured within the oblong recess formed in the implement extension. The pen component is also secured within the tapered extension of the first eyeglass component when the first eyeglass component and the attachment component are locked.

3 Claims, 4 Drawing Sheets

PEN AND GLASSES COMBINATION

BACKGROUND OF THE INVENTION

1. Field of the Invention

The present invention relates to a pen and glasses combination and more particularly pertains to providing the user with a writing implement that is always readily available with a pen and glasses combination.

2. Description of the Prior Art

The use of spectacle accessories is known in the prior art. More specifically, spectacle accessories heretofore devised and utilized for the purpose of allowing a pair of glasses to fulfill alternate needs are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,853,393 to Fila et al. discloses a tube means within an injection-molded temple for accommodating electric conductors therein.

U.S. Pat. No. 4,405,212 to Cooper discloses a spectacle frame and conversion accessories therefor.

U.S. Pat. No. 4,620,778 to Bertolli discloses a frame for glasses which permits the mounting of accessory elements.

U.S. Pat. No. 4,828,355 to Lipson et al. discloses a tubular eyeglass frame.

U.S. Pat. No. 5,061,105 to Isoda discloses a removable cap of writing instrument.

While these devices fulfill their respective, particular objective and requirements, the aforementioned patents do not describe a pen and glasses combination that provides the user with a writing implement that is always readily available.

In this respect, the pen and glasses combination according to the present invention substantially departs from the conventional concepts and designs of the prior art, and in doing so provides an apparatus primarily developed for the purpose of providing the user with a writing implement that is always readily available.

Therefore, it can be appreciated that there exists a continuing need for a new and improved pen and glasses combination which can be used for providing the user with a writing implement that is always readily available. In this regard, the present invention substantially fulfills this need.

SUMMARY OF THE INVENTION

In the view of the foregoing disadvantages inherent in the known types of spectacle accessories now present in the prior art, the present invention provides an improved pen and glasses combination. As such, the general purpose of the present invention, which will be described subsequently in greater detail, is to provide a new and improved pen and glasses combination and method which has all the advantages of the prior art and none of the disadvantages.

To attain this, the present invention essentially comprises a first eyeglass component having two receiving arms. One receiving arm has an oblong recess therein. The oblong recess has an open first end, a closed second end, and an intermediate extent therebetween. A tapered extension is integral with the closed second end. A female detent element is secured to the intermediate extent. The device also contains a curved ear component having a curved first end, a second end, and an intermediate extent therebetween. An externally threaded extension is secured to the second end. The curved first end functions to fit over a wearer's ear. The device contains an attachment component having a first end, a second end, and an intermediate extent therebetween. The first end has an internally threaded aperture therein. The internally threaded aperture corresponds with the externally threaded extension of the curved ear component. The device contains an implement extension having a first end, a second end, and an intermediate extent therebetween. The first end of the implement extension is integral with the second end of the attachment component. A male detent element is secured to the intermediate extent of the implement extension. The male detent element corresponds with the female detent element of the oblong recess of the first eyeglass component to lock the attachment component with the first eyeglass component. An .oblong recess is formed in the second end of the implement extension. The device lastly contains a pen component having a first end and a second end. The first end is secured within the oblong recess that is formed in the second end of the implement extension. The second end is secured within the tapered extension of the first eyeglass component when the first eyeglass component and the attachment component are locked.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pen and glasses combination which has all the advantages of the prior art spectacle accessories and none of the disadvantages.

It is another object of the present invention to provide a new and improved pen and glasses combination which may be easily and efficiently manufactured and marketed.

It is a further object of the present invention to provide a new and improved pen and glasses combination which is of durable and reliable construction.

An even further object of the present invention is to provide a new and improved pen and glasses combination which is susceptible of a low cost of manufacture with regard to both materials and labor, and which accordingly is then susceptible of low prices of sale to the consuming public, thereby making such a pen and glasses combination economically available to the buying public.

Still yet another object of the present invention is to provide a new and improved pen and glasses combination which provides in the apparatuses and methods of the prior art some of the advantages thereof, while simultaneously overcoming some of the disadvantages normally associated therewith.

Even still another object of the present invention is to provide a new and improved pen and glasses combination for providing the user with a writing implement that is always readily available.

Lastly, it is an object of the present invention to provide a new and improved pen and glasses combination with a first eyeglass component having one receiving arm with an oblong recess therein. A tapered extension is integral with the recess. A female detent element is secured to the recess. A curved ear component has an externally threaded extension and is secured thereon. The curved ear component functions to fit over a wearer's ear. An attachment component has an internally threaded aperture therein. The internally threaded aperture corresponds with the externally threaded extension of the curved ear' component. An implement extension is integral with the attachment component. A male detent element is secured to the implement extension. The male detent element corresponds with the female detent element of the oblong recess of the first eyeglass component to lock the attachment component with the first eyeglass component. An oblong recess is formed in the implement extension. A pen component is secured within the oblong recess formed in the implement extension. The pen component is also secured within the tapered extension of the first eyeglass component when the first eyeglass component and the attachment component are locked.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
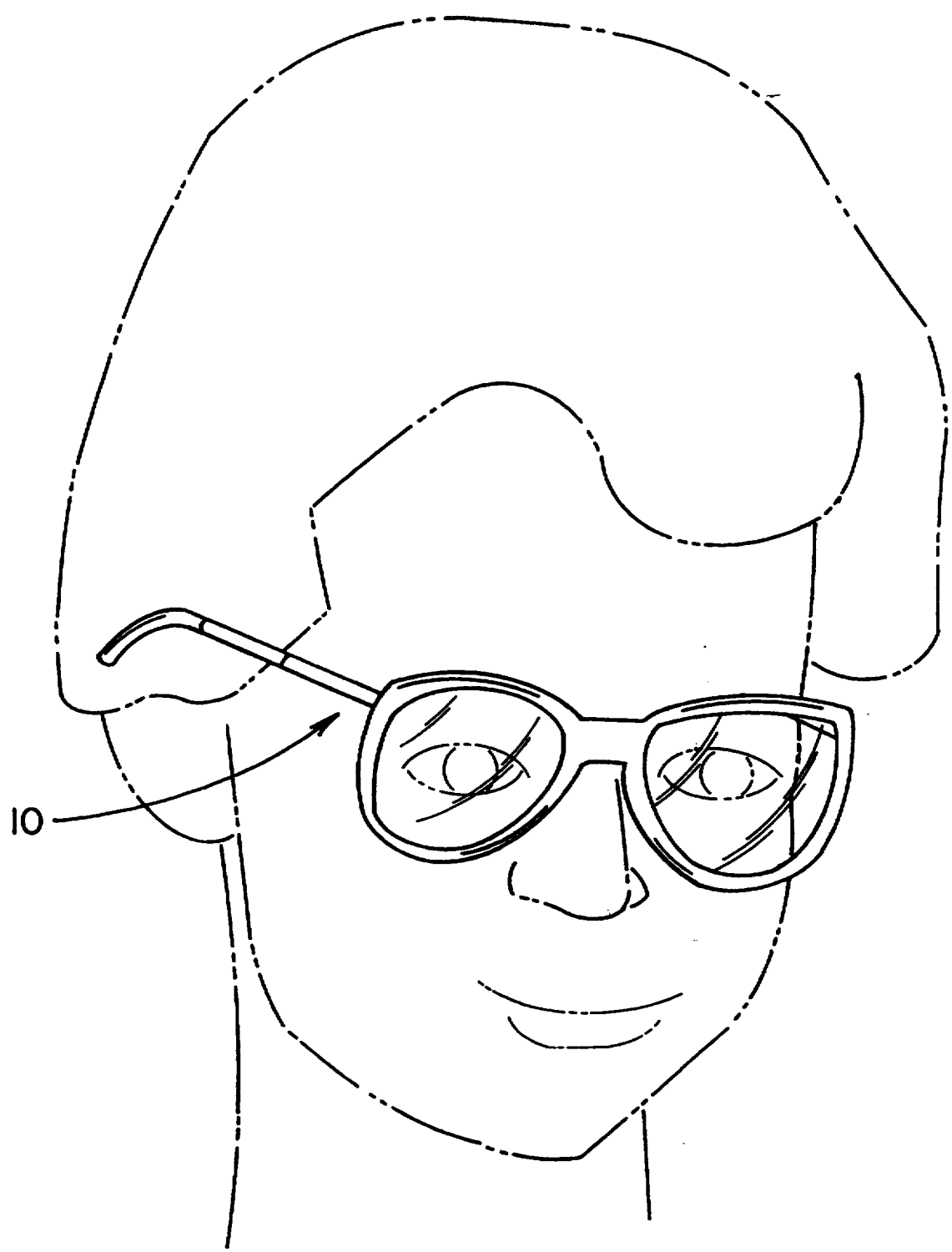
FIG. 1 is a perspective view of the preferred embodiment of the pen and glasses combination constructed in accordance with the principles of the present invention.
Figure 2:
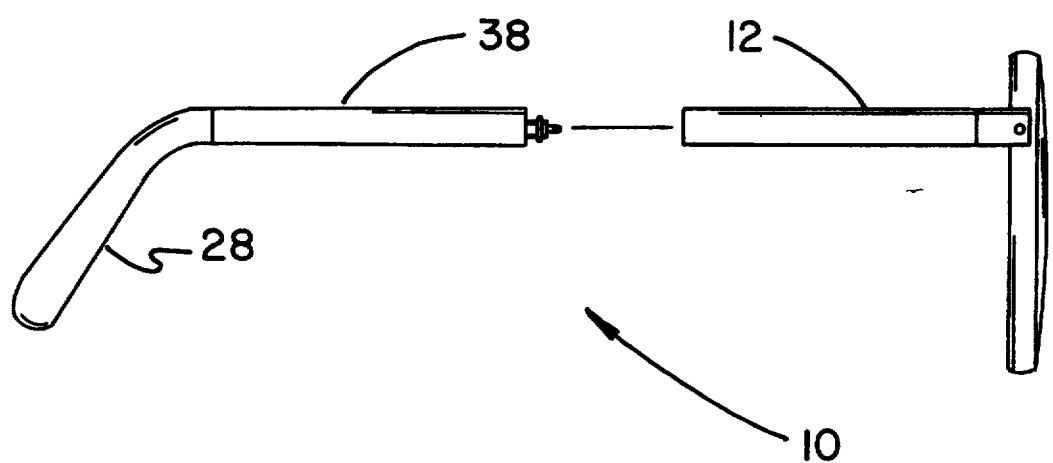
FIG. 2 is a partially exploded side view of the present invention.
Figure 3:
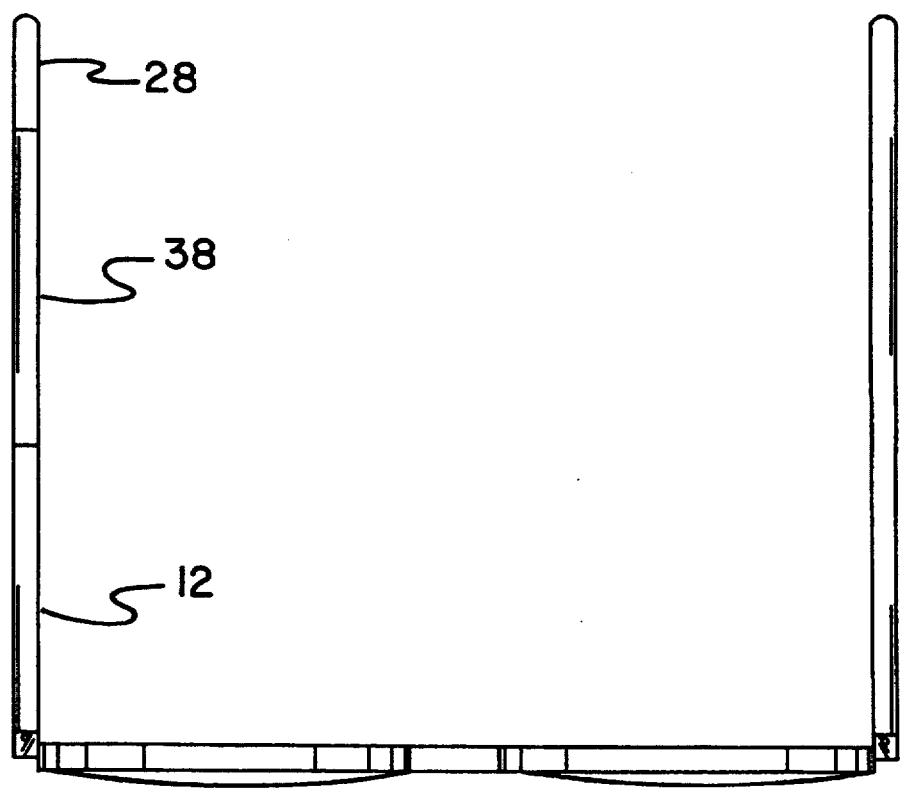
FIG. 3 is a plan view of the preferred embodiment of the present invention.
Figure 4:
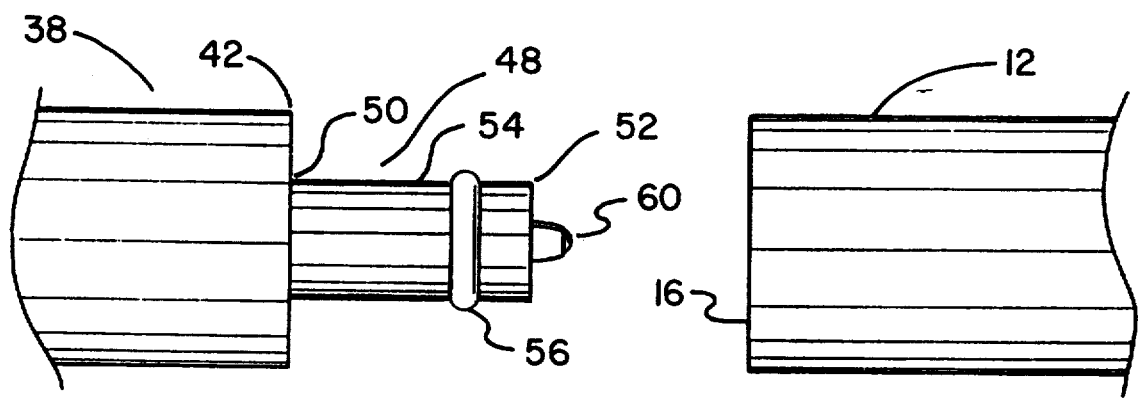
FIG. 4 is an enlarged side view of the pen portion of the present invention.
Figure 5:
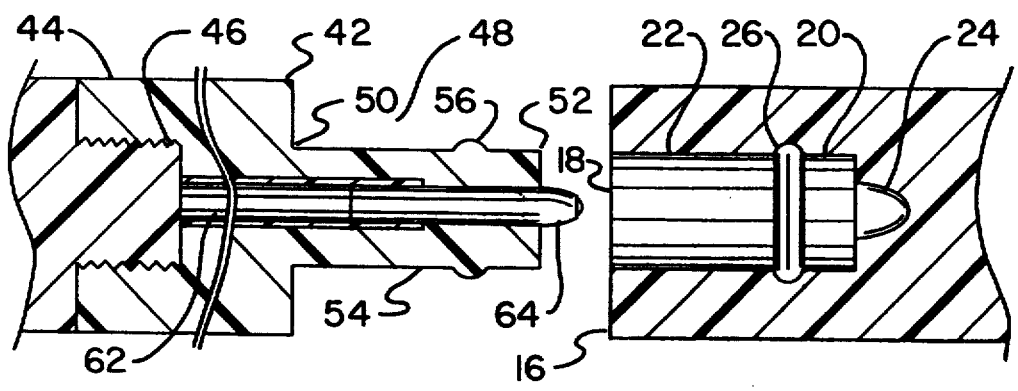
FIG. 5 is an enlarged side-sectional view of the pen portion of the present invention.
Figure 6:
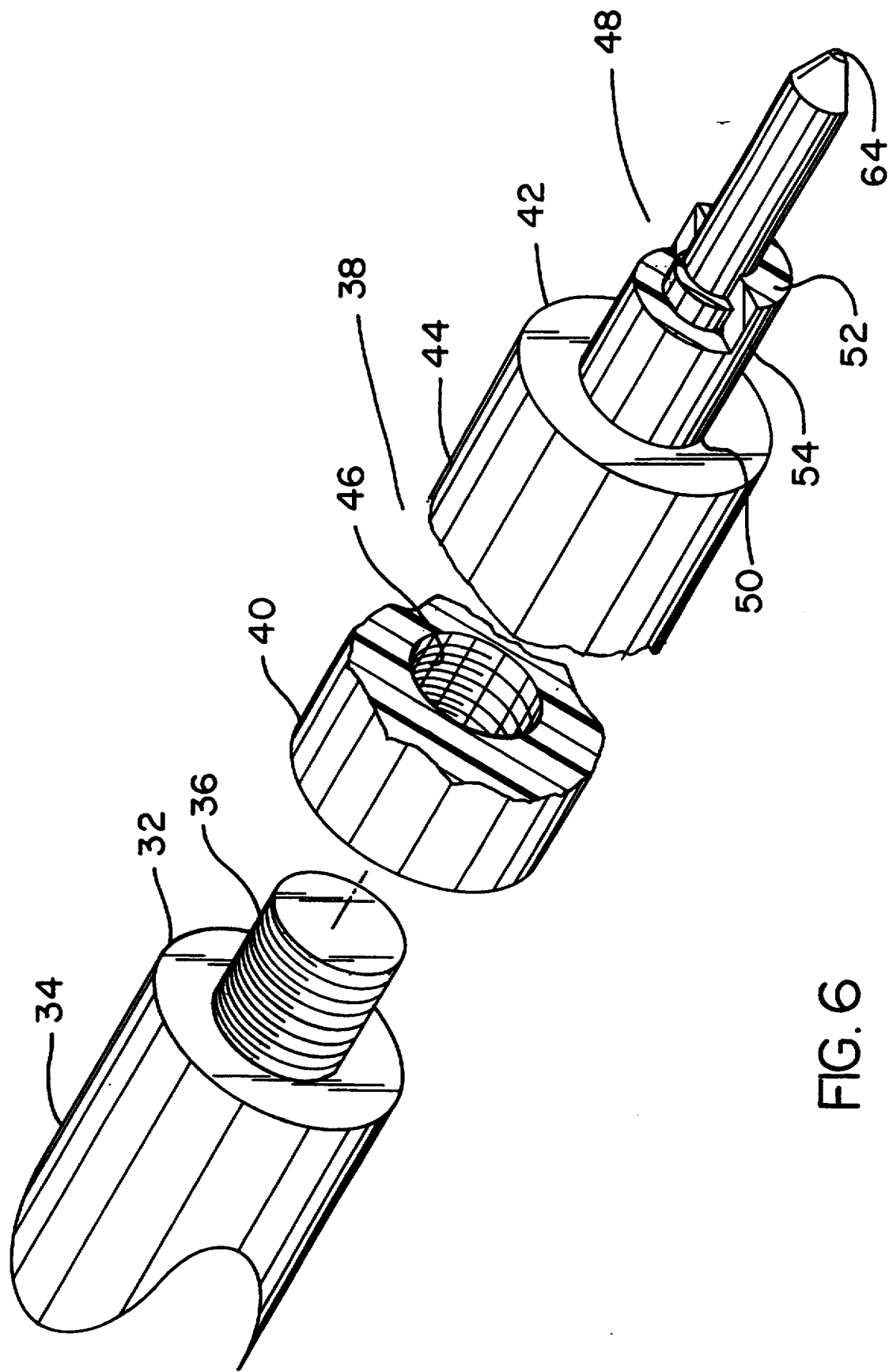
FIG. 6 is an exploded perspective view of the pen portion of the present invention.

With reference now to the drawings, and in particular, to FIG. 1 thereof, the preferred embodiment of the new and improved pen and glasses combination embodying the principles and concepts of the present invention and generally designated by the reference number 10 will be described.

Specifically, it will be noted in the various Figures that the device relates to a new and improved pen and glasses combination providing the user with a writing implement that is always readily available. In its broadest context, the device consists of a first eyeglass component, a curved ear component, an attachment component, an implement extension, and a pen component.

The device 10 contains a first eyeglass component 12 having two receiving arms 14. One receiving arm 14 has an oblong recess 16 therein. The oblong recess 16 has an open first end 18, a closed second end 20, and an intermediate extent 22 therebetween. A tapered extension 24 is integral with the closed second end 20. A female detent element 26 is secured to the intermediate extent 18.

The device 10 also contains a curved ear component 28 having a curved first end 30, a second end 32, and an intermediate extent 34 therebetween. An externally threaded extension 36 is secured to the second end 32. The curved first end 30 functions to fit over a wearer's ear.

The device 10 contains an attachment component 38 having a first end 40, a second end 42, and an intermediate extent 44 therebetween. The first end 40 has an internally threaded aperture 46 therein. The internally threaded aperture 46 corresponds with the externally threaded extension 36 of the curved ear component 28.

The device 10 contains an implement extension 48 having a first end 50, a second end 52, and an intermediate extent 54 therebetween. The first end 50 of the implement extension 48 is integral with the second end 42 of the attachment component 38. A male detent element 56 is secured to the intermediate extent 54 of the implement extension 48. The male detent element 56 corresponds with the female detent element 26 of the oblong recess 16 of the first eyeglass component 12 to lock the attachment component 38 with the first eyeglass component 12. An oblong recess 58 is formed in the second end 52 of the implement extension 48.

The device 10 lastly contains a pen component 60 having a first end 62 and a second end 64. The first end 62 is secured within the oblong recess 58 that is formed in the second end 52 of the implement extension 48. The second end 64 is secured within the tapered extension 24 of the first eyeglass component 12 when the first eyeglass component 12 and the attachment component 38 are locked.

A second embodiment of the present invention includes substantially all of the components of the present invention further including the substitutability of safety glasses instead of eyeglasses. Any type of eye wear can be incorporated including, but not limited to, sunglasses and bifocals.

The present invention is aptly described by its name. It combines two common items: a pair of glasses and a pen. The purpose of this product is to provide the user with a writing implement that is always readily available. For example, carpenters when working on a piece of wood, need a writing implement to mark dimensions. These glasses would be handy to have in numerous other situations as well.

The present invention looks like a regular pair of glasses. The appearance is deceiving, however. One arm of the glasses pulls apart into two pieces. The piece with the curved section that fits over the wearer's ear has a pen in it. The tip of the pen is hidden when the two pieces are joined together. The pen snaps in and out of its socket and it is this feature that keeps it from falling out at inappropriate times.

Anyone who wears glasses of any kind and needs ready access to a writing implement will derive considerable satisfaction from the present invention. This idea can be incorporated into safety glasses as well as reading glasses. Within those two broad categories, there would also be various styles and colors to suit a multitude of customer preferences.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A new and improved pen and glasses combination providing the user with a writing implement that is always readily available comprising, in combination:
   a first eyeglass component having two receiving arms, one receiving arm having an oblong recess therein, the oblong recess having an open first end, a closed second end, and an intermediate extent therebetween, a tapered extension integral with the closed second end, a female detent element secured to the intermediate extent;
   a curved ear component having a curved first end, a second end, and an intermediate extent therebetween, an externally threaded extension secured to the second end, the curved first end functioning to fit over a wearer's ear;
   an attachment component having a first end, a second end, and an intermediate extent therebetween, the first end having an internally threaded aperture therein, the internally threaded aperture corresponding with the externally threaded extension of the curved ear component;
   an implement extension having a first end, a second end, and an intermediate extent therebetween, the first end of the implement extension integral with the second end of the attachment component, a male detent element secured to the intermediate extent of the implement extension, the male detent element corresponding with the female detent element of the oblong recess of the first eyeglass component to lock the attachment component with the first eyeglass component, an oblong recess formed in the second end of the implement extension; and
   a pen component having a first end and a second end, the first end secured within the oblong recess formed in the second end of the implement extension, the second end secured within the tapered extension of the first eyeglass component when the first eyeglass component and the attachment component are locked.

2. The device as described in claim 1 and further comprising:
   wherein the first eyeglass component comprises a first safety glass component.

3. A pen and glasses combination comprising:
   a first eyeglass component having one receiving arm having an oblong recess therein, a tapered extension integral with the recess, a female detent element secured to the recess;
   a curved ear component having an externally threaded extension secured thereon, the curved ear component functioning to fit over a wearer's ear;
   an attachment component having an internally threaded aperture therein, the internally threaded aperture corresponding with the externally threaded extension of the curved ear component;
   an implement extension integral with the attachment component, a male detent element secured to the implement extension, the male detent element corresponding with the female detent element of the oblong recess of the first eyeglass component to lock the attachment component with the first eyeglass component, an oblong recess formed in the implement extension; and
   a pen component secured within the oblong recess formed in the implement extension, the pen component also secured within the tapered extension of the first eyeglass component when the first eyeglass component and the attachment component are locked.

* * * * *

UNITED STATES PATENT AND TRADEMARK OFFICE
CERTIFICATE OF CORRECTION

PATENT NO. : 5,430,503
DATED : July 4, 1995
INVENTOR(S) : Humberto Rodriguez

It is certified that error appears in the above-indentified patent and that said Letters Patent is hereby corrected as shown below:

Title page, item [19] col. 1, line 2, change "Colitz, Jr." to -- Rodriguez--.

Title page, item [76], change "Michael J. Colitz, Jr." to-- Humberto Rodriguez--.

Signed and Sealed this

Ninth Day of April, 1996

*Attest:*

BRUCE LEHMAN

*Attesting Officer*  *Commissioner of Patents and Trademarks*